Sept. 9, 1924.
J. H. BERG
1,508,155
MEAT FOOD PRODUCT AND METHOD OF MAKING SAME
Filed Aug. 1, 1922
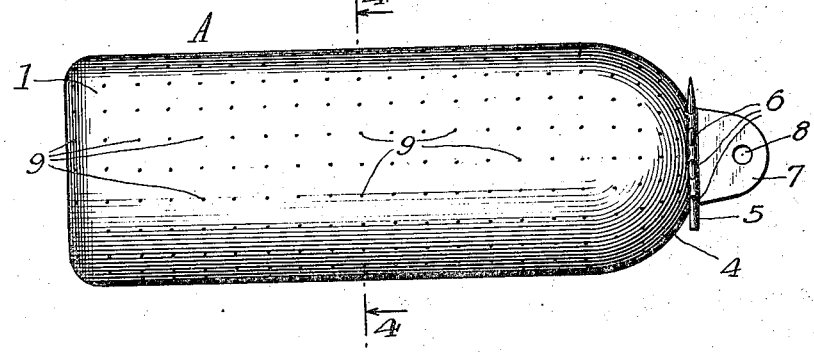
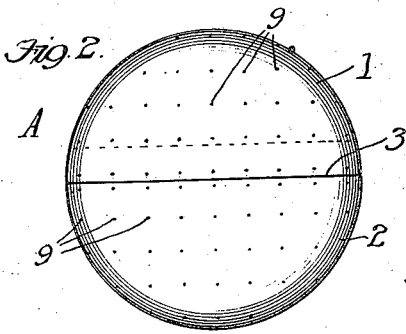
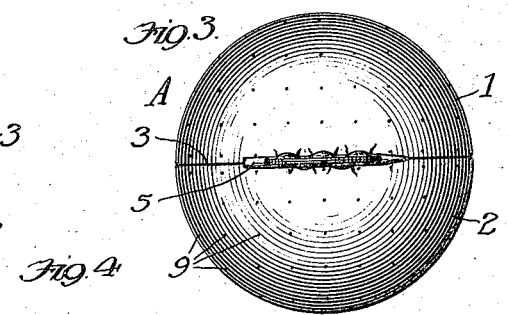
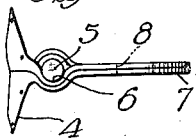
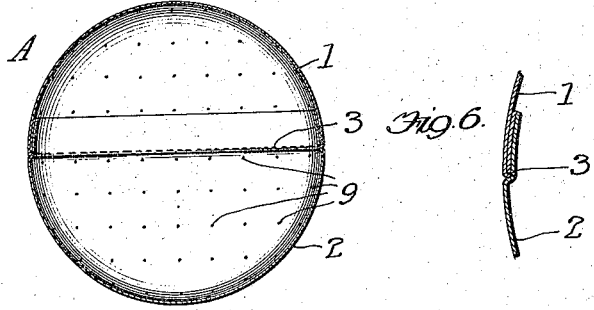
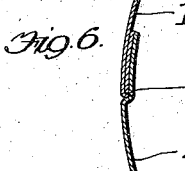
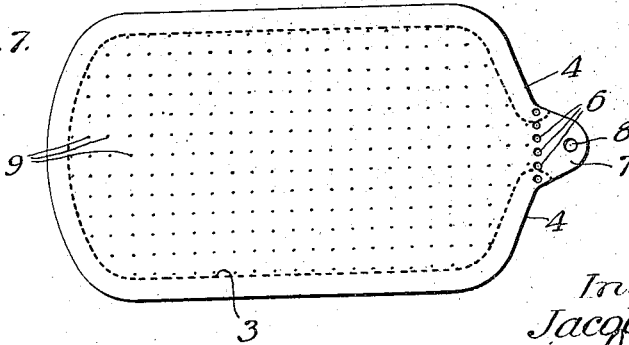
Witness
Martin H. Olsen.
Inventor
Jacob H. Berg.
By (signature)
Atty.

Patented Sept. 9, 1924.

1,508,155

UNITED STATES PATENT OFFICE.

JACOB H. BERG, OF CHICAGO, ILLINOIS.

MEAT-FOOD PRODUCT AND METHOD OF MAKING SAME.

Application filed August 1, 1922. Serial No. 578,886.

*To all whom it may concern:*

Be it known that I, JACOB H. BERG, a citizen of the United States, and a resident of Chicago, in the county of Cook and State of Illinois, have invented a certain new and useful Meat-Food Product and Method of Making Same, of which the following is a specification.

This invention relates to casings or containers for sausage and other minced and chopped meats.

Broadly stated the object of the invention is to provide an improved casing or container for sausage and various other minced and chopped meats when put up in casings or containers of such large size that it is impracticable to make them from intestines, and for which purpose cloth containers are used very extensively at the present time.

As is generally well known to persons familiar with this line of business, cloth containers are objectionable for a number of reasons, principal among which is that, being inedible and usable but once and, as sausage and similar products when put up in inedible containers, are sold to the trade by net weight—that is the weight of the containers being deducted from the gross weight of the product—the cost of said containers represents a large aggregate loss, which it is necessary to include in the "overhead" expense of the business.

Specifically, the object of the invention is to overcome the objections to the use of cloth casings or containers and to provide a container which is edible, thus permitting the product to be sold by gross weight instead of by net weight, as is the case when cloth casings or containers are used.

In accordance with my invention, I attain the objects thereof by the use of casings or containers made from animal hides—preferably pig hides, which have been dehaired and pickled—said pig or other skins being cut into pieces adapted to form casings or containers of desired sizes and shapes, the edges of which are sewed together or otherwise connected, leaving an end thereof open for filling, said open end being closed in any desired manner after the casing or container is filled. My invention also comprises the various other features and details of construction hereinafter described and claimed.

In the accompanying drawing, in which my invention is fully illustrated,

Figure 1 is a side view of a casing or container of my invention when filled.

Figures 2 and 3 are, respectively, views of the left and right hand ends of the casing or container shown in Fig. 1.

Figure 4 is a sectional elevation on the line 4—4 of Fig. 1, the filling being removed.

Figure 5 is a fragmentary side view, at ninety degrees from Fig. 1, of the end of the casing left open for filling, showing the same closed by means of a skewer.

Figure 6 is a fragmentary, detail, sectional view; and

Figure 7 is a plan view of the casing or container as initially stitched.

Casings or containers of my invention, designated as a whole A, are made of dehaired hides, preferably pig hides. In accordance with my invention, also, said pig or other skins will preferably be subjected to a pickling process in strong brine, or other suitable liquor.

Each casing or container consists of one or more pieces, the edges of which are sewed together or otherwise connected, the pieces from which said casings or containers are formed being shaped and proportioned to form containers of desired size and shape. As shown, the casing or container A consists of two similar pieces 1 and 2, the edges of which are connected by stitched seams 3, see particularly Fig. 7, said pieces 1 and 2 being shaped to form a substantially cylindrical casing or container, one end of which is left open to provide for filling the casing or container, said open end being preferably contracted, as shown, at 4.

A casing or container having been filled, the end 4 thereof left open for filling purposes, is closed, simple means for this purpose consisting of a skewer 5 inserted through holes 6 formed in the blanks or pieces from which the casing or container is made. Also, to provide for conveniently hanging up the filled casing or container when being processed or to expose the same for sale, portions of the blanks or pieces 1 and 2 which project beyond the skewer are preferably shaped to form flaps 7 provided with holes 8 adapted to receive a hook or the like.

As is well known, minced and chopped meats expand in cooking and to render the seams 3 of the casing or container A sufficiently strong so that they will not tear out while the contents of the filled casings or containers are being cooked or otherwise processed, said seams are formed at a considerable distance from the connected edges of the pieces of the skins forming the casing or container—say one half (½) an inch.

In practice, also, the pieces 1 and 2 will be stitched together so that as originally formed, the casing or container will be inside out. Thus, when the casings or containers have been stitched, turned and filled, the connected edges of the pieces 1 and 2 will be held firmly in contact with each other and also with the wall of the casings or containers, as shown in Fig. 4, thus forming a strong and also a substantially tight seam.

Also, to prevent the formation of what are known as air pockets directly beneath the walls of the casings or containers when filled—which would tend, and in time, probably would produce local deterioration of the filling, the walls of the casings or containers are preferably perforated in such manner that all of the air contained in said casings or containers may escape as the filling of said casings progresses. Said perforations, designated 9, may conveniently be formed by means of sharp pointed brads of small size, say one thirty second ($\frac{1}{32}$) of an inch in diameter as a maximum, said perforation being spaced from one half (½) to one (1) inch apart. Also, only the portions of the pieces 1 and 2 inside of the contemplated lines of the seams 3 will be perforated, although my invention contemplates perforating said pieces over their entire area if desired. I have discovered that in addition to venting the casings, perforating said casings also reduces shrinkage of the skins and leaves them in much better condition for cooking or smoking.

I have also discovered that when the filled, perforated, casings or containers are subjected to heat, in processing the same, the perforations in the casing or container will become sealed.

After the casings or containers have been filled, they are "processed", said processing consisting either in curing them by smoking or in first cooking and subsequently smoking them, the smoking imparting a brown color and "smoky" taste and smell, which are very appetizing and highly desirable from a commercial standpoint.

The product is now finished and ready for the market.

In the claims, I have used the word "chopped" to include all meat when cut up into pieces, whether known to the trade as "chopped" or "minced" meat.

Where the skins, as removed from the hogs or other animals are thicker than desirable for use as casings or containers, I contemplate splitting them to make them of desired thickness. Also, where the skins are sufficiently thick, both parts of the split skins may be used, thus, in many cases, practically doubling the number of casings or containers produced from a single skin and correspondingly reducing the cost of same.

In Fig. 7 of the drawing, I have shown what may be considered either as a blank of proper shape to form a container such as shown in Fig. 1, or the casing or container itself as initially stitched and before being turned and filled.

Among important advantages of my improved casings or containers may be enumerated the following:—

Due to the fact that said casings or containers are edible, the finished product may be sold to the trade by gross weight instead of by net weight, as heretofore, thus materially reducing the cost of production.

The shrinkage in weight due to evaporation in cooking or processing is appreciably less where skin casings or containers are used than when cloth, intestine, or membrane casings or containers are used.

It provides a large market for pig skins, of which, at the present time very little use is made, thereby rendering valuable a product which, heretofore, has been of very little or no value.

It avoids the waste due to the use of cloth containers; and

The color of the product when processed is better and more uniform than is the case where cloth, intestine, or membrane casings or containers are used.

I claim:

1. A meat food product consisting of a casing made of dehaired animal hides and a filling of chopped meat, the product being processed to render not only the meat-filling but also the hide edible.

2. The food product specified in claim 1, the casing being made from hide which was preliminarily pickled.

3. The food product specified in claim 1, the casing being made of pickled pig-hide.

4. The food product specified in claim 1, the hide forming the casing being perforated and having said perforations closed by the processing.

5. The method substantially as herein described of making an encased chopped-meat food product consisting in first making the casing of dehaired pickled animal hides, filling said casing with chopped meat and closing the casing, and finally processing the product to render the whole edible.

6. The method substantially as herein described of making an encased chopped-meat food product consisting in first making a casing of pieces of dehaired animal hides stitched together, this casing being formed inside-out, the connecting seams being of considerable width so that when the casing is turned right-side-out and filled and processed to render the whole edible the seams will be strong and practically airtight.

7. The method substantially as herein described of making an encased chopped-meat product consisting first in pickling dehaired animal hides, then making a casing therefrom, then filling said casing with chopped meat, closing the casing, and finally processing the same to render the whole edible.

8. The method substantially as herein described of making an encased chopped-meat product consisting first in pickling dehaired perforated animal hides, then making a casing therefrom, then filling said casing with chopped meat, closing the casing, and finally processing the same to render the whole edible and close said perforations.

In witness that I claim the foregoing as my invention, I affix my signature this 27th day of July, A. D. 1922.

JACOB H. BERG.